(12) United States Patent
Kollegger et al.

(10) Patent No.: US 9,340,213 B2
(45) Date of Patent: May 17, 2016

(54) VEHICLE WITH A SAFETY SYSTEM INVOLVING PREDICTION OF DRIVER TIREDNESS

(75) Inventors: Peter Kollegger, Göteborg (SE); Fredrich Claezon, Värmdö (SE); Alexandra Frid, Stockholm (SE); Fredrik Åström, Gävle (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 14/110,717

(22) PCT Filed: Apr. 16, 2012

(86) PCT No.: PCT/SE2012/050409
§ 371 (c)(1),
(2), (4) Date: Oct. 22, 2013

(87) PCT Pub. No.: WO2012/144948
PCT Pub. Date: Oct. 26, 2012

(65) Prior Publication Data
US 2014/0046546 A1 Feb. 13, 2014

(30) Foreign Application Priority Data
Apr. 20, 2011 (SE) ...................................... 1150345

(51) Int. Cl.
*B60W 40/09* (2012.01)
*B60L 3/02* (2006.01)
(Continued)

(52) U.S. Cl.
CPC *B60W 40/09* (2013.01); *B60L 3/02* (2013.01); *B60R 21/00* (2013.01); *G07C 5/002* (2013.01);
(Continued)

(58) Field of Classification Search
CPC ..................... B60W 2040/0827; B60W 40/09; B60W 2540/18; B60W 2050/0089; B60W 2540/22; B60W 2050/146; B60W 50/0097; B60W 2540/28; G07C 5/002; B60L 3/02; B60R 21/00; G08B 21/06; G08B 31/00
See application file for complete search history.

(56) References Cited

U.S. PATENT DOCUMENTS 4,359,725 A * 11/1982 Balogh et al. ................. 340/576
6,313,749 B1 * 11/2001 Horne et al. .................. 340/575
(Continued)

FOREIGN PATENT DOCUMENTS

EP 1 291 226 A2 3/2003
EP 2509049 A1 * 10/2012
(Continued)

OTHER PUBLICATIONS

International Search Report mailed Jul. 5, 2012 in corresponding PCT International Application No. PCT/SE2012/050409.
(Continued)

*Primary Examiner* — Rami Khatib
*Assistant Examiner* — Jeffrey Boomer
(74) *Attorney, Agent, or Firm* — Ostrolenk Faber LLP

(57) ABSTRACT

A vehicle (2) has a tachograph (4) which generates a tachograph signal (6) containing information about current clock time and the times of the vehicle's movements, a driver's report input unit (8) generates a signal (10) containing information about driving and rest times for the driver, including monitoring (12) of driver activity which generates an alertness signal (14) containing information about the driver's activity in the vehicle. A safety system (18) has a control unit (20) and an alertness modelling unit (22) which calculates a current and a predicted tiredness values (KSS) for the driver based on the tachograph signal (6) and/or the driver's report signal (10). The tiredness values are conveyed to a control unit which determines control signals (24) for the vehicle's driver support systems.

22 Claims, 3 Drawing Sheets

(51) Int. Cl.
*G07C 5/00* (2006.01)
*B60R 21/00* (2006.01)
*G08B 21/06* (2006.01)
*B60W 50/02* (2012.01)
*G08B 29/08* (2006.01)
*B60W 50/00* (2006.01)
*B60W 50/14* (2012.01)
*G08B 31/00* (2006.01)

(52) U.S. Cl.
CPC ............ *G08B 21/06* (2013.01); *B60W 50/0097* (2013.01); *B60W 2050/0089* (2013.01); *B60W 2050/146* (2013.01); *B60W 2540/18* (2013.01); *B60W 2540/22* (2013.01); *B60W 2540/28* (2013.01); *G08B 31/00* (2013.01); *Y02T 10/84* (2013.01)

(56) References Cited

U.S. PATENT DOCUMENTS

| | | | |
|---|---|---|---|
| 6,661,345 B1 | 12/2003 | Bevan et al. | 340/575 |
| 2005/0246134 A1* | 11/2005 | Nagai et al. | 702/182 |
| 2006/0200008 A1* | 9/2006 | Moore-Ede | 600/300 |
| 2007/0080816 A1* | 4/2007 | Haque et al. | 340/576 |
| 2008/0021606 A1* | 1/2008 | Kimmich et al. | 701/35 |
| 2008/0150734 A1* | 6/2008 | Johns | 340/575 |
| 2008/0252412 A1* | 10/2008 | Larsson | B60R 25/25 340/5.2 |
| 2009/0198415 A1* | 8/2009 | Tanaka | B60W 40/09 701/41 |
| 2009/0273458 A1* | 11/2009 | Almqvist et al. | 340/439 |
| 2012/0233081 A1* | 9/2012 | Hishiki et al. | 705/317 |
| 2013/0021463 A1* | 1/2013 | Hatakeyama | 348/78 |
| 2013/0088369 A1* | 4/2013 | Yu et al. | 340/905 |
| 2013/0226408 A1* | 8/2013 | Fung et al. | 701/41 |
| 2013/0234823 A1* | 9/2013 | Kahn et al. | 340/3.1 |
| 2013/0304326 A1* | 11/2013 | Van Dongen et al. | 701/42 |
| 2016/0023662 A1* | 1/2016 | Wulf | B60W 40/08 340/576 |

FOREIGN PATENT DOCUMENTS

WO    WO 2008103119 A1 * 8/2008
WO    WO 2009/126071 A1  10/2009

OTHER PUBLICATIONS

T. Åkerstedt et al., "Predictions from the Three-Process Model of Alertness," Aviation, Space, and Environmental Medicine, vol. 75, No. 3, Section II, pp. A75-A83, Mar. 2004.

T. Åkerstedt et al. "Predicting road crashes from a mathematical model of alertness regulation—The Sleep/Wake Predictor," Accident Analysis and Prevention, 40 (2008), pp. 1480-1485.

* cited by examiner

VEHICLE WITH A SAFETY SYSTEM INVOLVING PREDICTION OF DRIVER TIREDNESS

CROSS-REFERENCE TO RELATED APPLICATIONS

The present application is a 35 U.S.C. §§371 national phase conversion of PCT/SE2012/050409, filed Apr. 16, 2012, which claims priority of Swedish Application No. 1150345-5, filed Apr. 20, 2011, the contents of which are incorporated by reference herein. The PCT International Application was published in the English language.

FIELD OF THE INVENTION

The present invention relates to a vehicle with a safety system and a method for such a vehicle.

BACKGROUND TO THE INVENTION

It is difficult to prove, but as many as 40% of all vehicle accidents could be due to tiredness. The risk of generating unfounded warnings which are therefore not accepted means that there is no way to safely warn drivers by the methods currently available.

Within the research community, it is accepted that there is a connection between tiredness and steering behaviour, how well a vehicle stays in its traffic lane and even how human beings blink. There is however no single threshold value or single function such that a certain value/behaviour would consistently indicate that a driver is tired.

U.S. Pat. No. 6,313,749 B1 relates to detection of vehicle driver tiredness, uses a number of different sensors to detect the vehicle's status and the driver's alertness, and converts the signals from the sensors to weighted factors which are used to adjust a model which reflects the driver's biological diurnal rhythm. The adjusted model is then used to generate warnings to the driver.

U.S. Pat. No. 6,661,345 B1 relates to a monitoring system for monitoring the alertness of a vehicle driver. The system comprises inter alia an acoustic sensor or a microwave sensor. The output signals from the sensor are processed using an algorithm with respect to driver alertness and a processed signal is generated. The processed signal is then used to assess the driver's alertness.

A difficulty with many of the systems currently used to warn the driver when he/she is tired is in the individual adaptation of systems, since it is not possible to use a general threshold value applicable to all drivers, which makes it inappropriate to warn the driver directly. For certain drivers, the systems will not generate any warning at all even if the driver is dangerously tired, whilst for other drivers the systems will generate a warning even if the driver is very alert. The systems therefore only marginally increase traffic safety and there is a risk that acceptance of all similar systems will be low if false warnings commonly occur.

Certain methods require a great deal of extra equipment which the driver must carry or information which the driver must put into the system/method manually.

Within the research community, it is accepted that there is a relatively general human diurnal rhythm. Researchers at Sweden's Stress Research Institute, Torbjörn Åkerstedt et al., have developed a model of the diurnal rhythm called the "Sleep/Wake Predictor" (SWP) model, which inter alia uses prior sleep and length of time since waking as a basis for approximating a person's alertness level.

More specifically, the model is based on three components, viz. alertness level (S), circadian rhythm (C) over a period of 24 hours, which characterises the biological sleep pattern, and 12-hour ultradian rhythm (U) based on diurnal biological activity, e.g. after a person has eaten, also known as the "after-lunch dip".

The alertness level S is itself affected by three factors, namely the time of day, the length of time since waking and the duration of sleep. More specifically, S represents the time since waking and is modelled as an exponential function with a maximum value at the moment when a person wakes and an asymptotic decay at the end of the awake period. When the person goes to sleep, the way alertness is "recovered" during the sleeping period is that the alertness level rises quickly at the beginning of the sleep but the rate of increase declines asymptotically at the end of the sleep period.

The functions used to calculate S are as follows:

$$S = L + (S(t_a) - L)e^{d(t-t_a)} \quad \text{(equation 1)}$$

where t is clock time in hours, $t_a$ the time when a person wakes, d the rate of decay and L the lower horizontal asymptote.

$$S' = H - (H - S(t_s))e^{g(t-t_s)} \quad \text{(equation 2)}$$

where $t_s$ is the time when the person goes to sleep and H is the upper horizontal asymptote.

$$g = \frac{1}{8}\ln\left(\frac{H-14}{H-7.96}\right) \quad \text{(equation 3)}$$

The constants in equations 1-3 have the default values L=2.4, d=0.0353 and H=14.3.

S' represents the increase in tiredness of a person sleeping too little for a number of days in succession and caters for the difficulty of recovering over-quickly from a long period of shortage of sleep. This limitation has been introduced as a breakpoint to prevent too steep an increase in the exponential function for a specific value of S'.

The overall result is the following set of functions to determine S:

$$S = \begin{cases} L + (S(t_a) - L)e^{-d(-t-t_a)} & \text{awake} \\ S(t_s) + g(t-t_s)(S_b - H) & \text{asleep: } t \leq t_b \\ H - (H - S_b)e^{g(t-t_s-t_b)} & \text{asleep: } t > t_b \end{cases}$$

The constant $S_b$ relates to the breakpoint and has the value 12.2 and the variable $t_b$ is the time when S is equal to $S_b$.

It should be noted that the invention is not limited to the constants stated above for determination of S, as other values of them may of course be used to adjust the calculations according to the prevailing circumstances.

The process C thus represents the body's biological clock, the circadian rhythm, and is modelled using a sine wave which has during the afternoon a maximum value defined as $$C = a_c \cos\left(\frac{2\pi(t - p_C)}{24}\right)$$

where t is clock time in hours and the constants $a_c$=2.5 and $p_C$=18.

The process U represents the ultradian rhythm with a decrease in alertness at 15.00 hours which is defined as $$U = m_U + a_U \cos\left(\frac{2\pi(t - p_U)}{12}\right)$$

where t is clock time in hours and the constants $m_U$=−0.5, $a_U$=0.5 and $p_U$=15.

S, C and U are calculated by putting a value for clock time t into the formulae.

Calculating S, C and U produces current values for them when t=0 and future values for them when t>0.

For a complete review of the SWP model, we cite "Predicting road crashes from a mathematical model of alertness regulation—The Sleep/Wake Predictor." Accident Analysis and Prevention, 40, pp. 1480-1485, by Åkerstedt, T et al. (2008). and "Predictions from the three-process model of alertness". Aviat. Space Environm Med, 75(3, Suppl.), A75-83, by Åkerstedt, T., Folkard, S., & Portin, C. (2004).

The SWP model thus makes it possible to determine the components S, C and U, and their aggregate can be used to calculate a value on a tiredness scale, the so-called "Karolinska Sleepiness Scale" (KSS), using the formula

KSS=10.9−0.6(S+C+U)

KSS may assume values of between 1 and 9, where low values mean that a person is alert and high values that a person is tired, for example:
1—very alert.
5—neither sleepy nor alert.
7—tired, but can stay awake without effort.
9—very tired, staying awake takes effort.

The object of the present invention is to propose an improved safety system for a vehicle which is easier to use than current systems and caters for the different activity and rest patterns of different drivers.

SUMMARY OF THE INVENTION

The method first takes account of the time of day, e.g. by reading in from the tachograph, and then checks, if possible, the driver's prior diurnal rhythm. The relevant factors are the driver's activities/diurnal rhythm over the last few days. The best case is where the driver has only used the current vehicle and has a driver's card containing full information about his/her driving and rest times. The worst case is no available information about prior activities.

If full information is available, it is possible to use the time of day and the driver's prior driving time to calculate the maximum amount of sleep he/she may have had. This can be supplemented with indications from the vehicle's other systems. For example, adjustment of the radio or the air-conditioning system may indicate that the driver was awake, the vehicle's locks might indicate when the vehicle was left and when the driver locked the vehicle for the night, returned to the vehicle or stepped out to start the day's shift. If the driver slept in the vehicle, a motion sensor in the alarm might indicate when he/she lay down and subsequently got up. The overall result is a better picture of prior sleep.

If information is unavailable or incomplete, the method proceeds on the basis of an appropriate maximum of prior rest.

Rest and time of day provide a modelled estimate of how tired/alert the driver is and also how this is likely to change while driving. It would then be possible to have, for example, the lane departure warning system generate a warning earlier and/or more forcefully when the estimate is high, or to deactivate the cruise control or increase the distance from vehicles in front if there is an adaptive cruise control. Where an Automatic Emergency Brake system is available, the threshold value for the earliest warning or braking action would be reduced so that warnings can be generated or braking be activated earlier. It would also be possible to display the estimate to the driver or to a transport control centre to make it easier to plan the journey and future journeys safely.

If other tiredness detection/prediction systems are available, e.g. systems based on the driver's steering behaviour, the vehicle's movements in its traffic lane or the driver's blink pattern, it would be possible to use the estimate to increase their reliability.

The system and method according to the invention also use information gathered from the vehicle, such as time of day. The driver's prior diurnal rhythm is estimated from, for example, the driver's card. To define the diurnal rhythm, the invention uses other systems in the vehicle as indications of whether the driver is sleeping or resting.

The uncertainty about tiredness which makes direct warnings inappropriate can be partly avoided without affecting acceptance. Systems such as LDW (Lane Departure Warning), AEB (Automatic Emergency Brake), AiCC (adaptive cruise control), cruise control and Scania Driver Support all have various parameters which determine when and how they are activated or how the driver is assessed and provided with hints.

For example, the LDW system which warns of the vehicle "veering" out of its traffic lane can be adjusted so that the warning is issued earlier and more forcefully when the driver is assessed as being tired. The AEB system can issue a more forceful warning and activate braking earlier. Scania Driver Support makes it possible to give point scores for drivers/hauliers planning a journey so that the drivers have low tiredness levels. Scania Driver Support, which provides hints on how to improve driving, might provide traffic safety hints after a journey where the driver was assessed as over-tired.

The method and system according to the invention might also give the driver and/or haulier/control centre a direct estimate, from the start of the driving shift, of when during a journey the driver will be assessed as tired. Humans are good at estimating their own tiredness but not at trusting themselves or appreciating likely consequences.

Advantages of the Solution

No need for driver to input any information. Information is gathered from vehicle.

No further sensors required to measure driver behaviour.

Warnings which are uncertain result in low acceptance; the method according to the invention adjusts existing systems to increase traffic safety when accidents are more likely to occur.

SWP is a general model and should not be considered an exact gauge of tiredness but rather as a probable estimate of how tired the driver is.

An important aspect of applying the SWP model and calculating KSS is that they make it possible to predict the tiredness level in the future, e.g. over the next 36 hours.

This makes it possible for example to calculate the amount of time before a given KSS threshold value is reached.

According to the invention, the input signals used by the model come from the vehicle's tachograph, from the driver's card and from reading other systems in the vehicle, e.g. via the CAN network. No input from the driver is required. Information about the vehicle is obtainable from the tachograph even when the vehicle is switched off.

DETAILED DESCRIPTION OF PREFERRED EMBODIMENTS OF THE INVENTION

With reference to the attached figures, the invention will now be described in detail.

Figure 1:
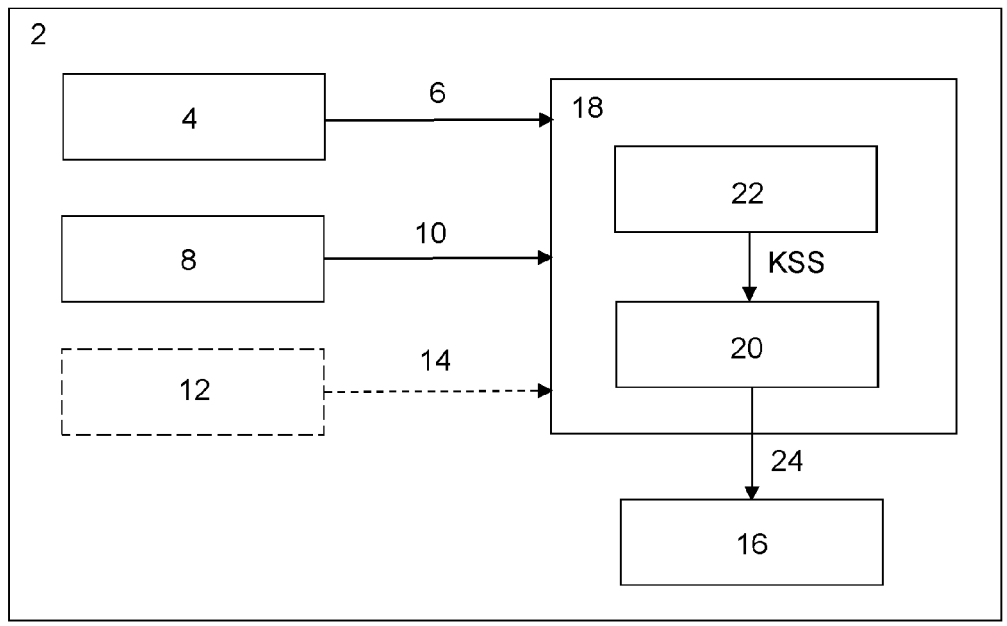
FIG. 1 is a schematic block diagram which illustrates the present invention.

FIG. 1 shows a schematic block diagram of the invention.

The invention thus comprises a vehicle 2, e.g. a truck, bus or car, provided with a tachograph 4 adapted to generate a tachograph signal 6 containing inter alia information about current clock time and the times of the vehicle's movements. The vehicle further comprises a driver's card input unit 8 adapted to generate a driver's card signal 10 containing inter alia information about driving and rest times for the driver, and preferably a monitoring system 12 for monitoring of driver activity which is adapted to generate an alertness signal 14 containing information about the driver's activity in the vehicle. The monitoring system may take the form of motion sensors so positioned that they can, for example, detect the driver's movements in the driving seat or his/her eye movements. Other movements or activities which can be detected by the monitoring system include the driver adjusting the vehicle's radio.

The monitoring system can also be adapted to monitor the driver's steering behaviour or to monitor the vehicle's movements in its traffic lane.

The vehicle further comprises one or more driver support systems 16, for example, a Lane Departure Warning system and an Automatic Emergency Brake system.

In addition, the vehicle comprises a safety system 18 with a control unit 20 and an alertness modelling unit 22 adapted to calculate a current tiredness value (KSS) and predicted tiredness values (KSS) for the driver over a predetermined future period of time. An alertness model ("sleep/wake predictor"—SWP) as discussed above is used to calculate KSS values on the basis of said tachograph signal 6 and/or driver's card signal 10. According to one embodiment, the alertness signal 14 is also used in calculating current and predicted tiredness values.

The calculated current and predicted tiredness values (KSS values) are arranged to be conveyed to said control unit 20, which is adapted to determine control signals 24 for the vehicle's driver support systems on the basis of these tiredness values.

According to the invention, the tiredness value (KSS) is calculated using the formula KSS=10.9−0.6(S+C+U), where S denotes the driver's alertness level, C denotes the circadian rhythm over a period of 24 hours, which characterises the biological sleep pattern, and U denotes the 12-hour ultradian rhythm based on the driver's diurnal biological activity. We here cite the detailed description of the KSS value calculations given in the background section, and the articles referred to therein.

The predetermined future period of time is shorter than 36 hours and preferably shorter than 12 hours.

The KSS value may thus assume values of between 1 and 9, where 1 is least tiredness and 9 most tiredness.

The control signals 24 are calculated by the control unit 20 and may, for example, affect threshold values for driver support systems 16 such that the higher the KSS value the safer the driver support system settings, which means, for example, that setting driver support system threshold values more suited to the tiredness level of a tired driver lowers the threshold values, making the systems more sensitive. Driver support system is to be regarded as a general concept which may, for example, comprise one or more from among Lane Departure Warning system, Automatic Emergency Brake system and a display system in the vehicle for display of calculated tiredness values to inform and alert the driver.

The tiredness value (KSS) is preferably calculated continuously, which means that a current value is always available and the future time-horizon is constantly changing.

As the parameters affecting the KSS value do not change very quickly, the KSS value need not be calculated continuously and may be calculated at a predetermined interval, e.g. 10-1000 seconds between consecutive calculations.

Figure 2:
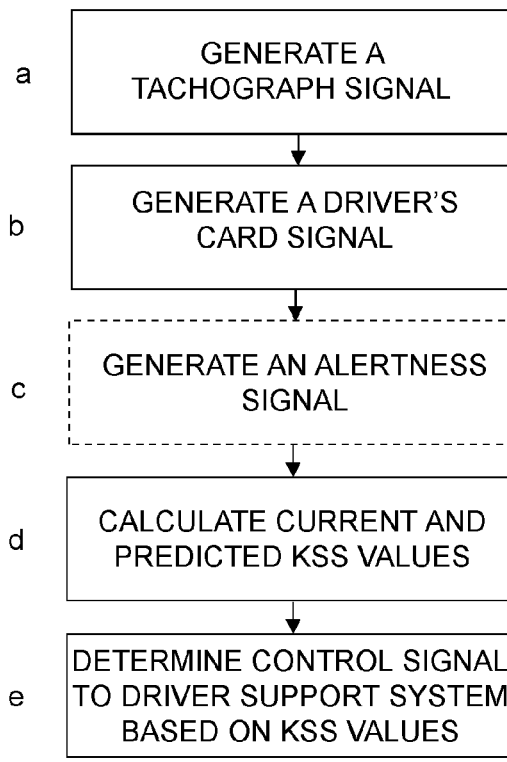
FIG. 2 is a flowchart illustrating the method according to the present invention.

With reference to the flow diagram in FIG. 2, a method in accordance with the invention for a vehicle will now be described.

The method comprises:

(a) generating from a tachograph, a tachograph signal containing information about current clock time and the times of the vehicle's movements, (b) generating from a driver's card input unit, a driver's card signal containing information about driving and rest times for the driver.

The vehicle further comprises one or more driver support systems, e.g. a Lane Departure Warning system and an Automatic Emergency Brake system.

The method further comprises:

(d) calculating, in an alertness modelling unit situated in a safety system, a current tiredness value (KSS) and predicted tiredness values (KSS) for the driver over a predetermined future period of time, using an alertness model (sleep/wake predictor—SWP) based on said tachograph signal and/or driver's card signal, and (e) said calculated current and predicted tiredness values being arranged for conveying to a control unit situated in said safety system and adapted to determine control signals for the vehicle's driver support systems on the basis of said tiredness values.

According to one embodiment of the invention, the method also comprises:

(c) generating an alertness signal, from a monitoring system for monitoring driver activity, containing information about the driver's activity in the vehicle. The alertness signal is used in calculating the current and predicted tiredness values.

According to the method according to the invention, the tiredness value (KSS) is calculated using the formula $$KSS=10.9-0.6(S+C+U).$$

The parameters involved and how they are calculated were discussed in detail above and that discussion is here cited.

The predetermined future period of time is shorter than 36 hours and preferably shorter than 12 hours.

According to one embodiment of the method, the control signals affect the tiredness values for driver support systems such that the higher the KSS value the safer, i.e. the more sensitive, the driver support system settings.

The tiredness value (KSS) is calculated using a predetermined interval of 10-1000 seconds between consecutive calculations.

According to another embodiment, the control unit is adapted to generate a control signal to a display system in the vehicle for display of calculated tiredness values.

The monitoring system is adapted to use for example motion sensors to monitor for example the driver's movements in the vehicle, his/her steering behaviour and/or the vehicle's movements in its traffic lane. It may further be adapted to detect whether the driver for example adjusts the vehicle's radio.

Figure 3:
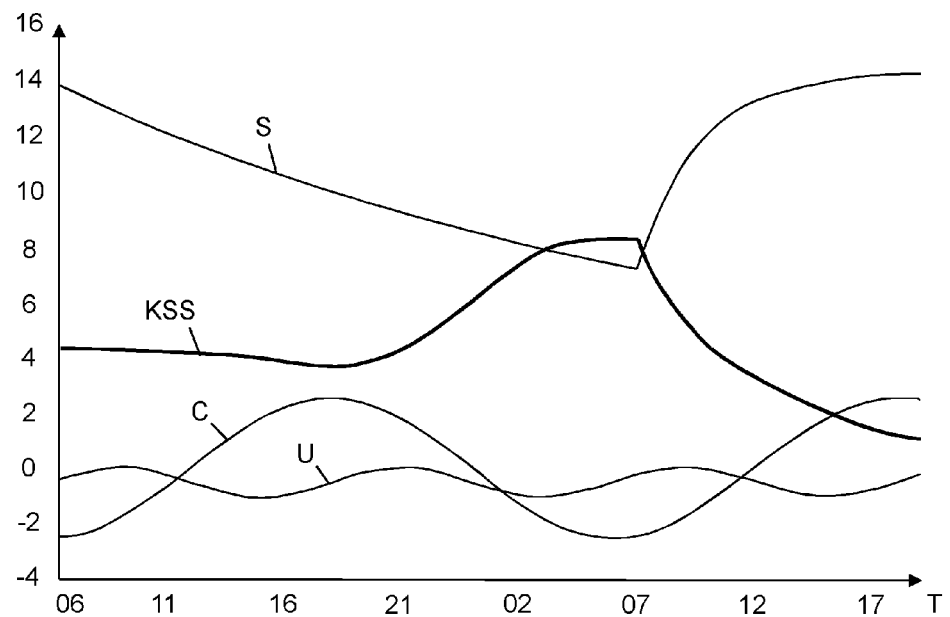
FIGS. 3 and 4 show graphs which illustrate two embodiments of the present invention.

FIG. 3 shows how S, C and U vary over a period of approximately 36 hours. It also shows the variation in the calculated KSS value. The alertness level S shows the person having gone to sleep and his/her alertness level then slowly dropping until he/she rests again at 7 o'clock. The circadian and ultradian rhythms were explained above and KSS is a scale (1-9) which approximates a person's relative tiredness.

Figure 4:
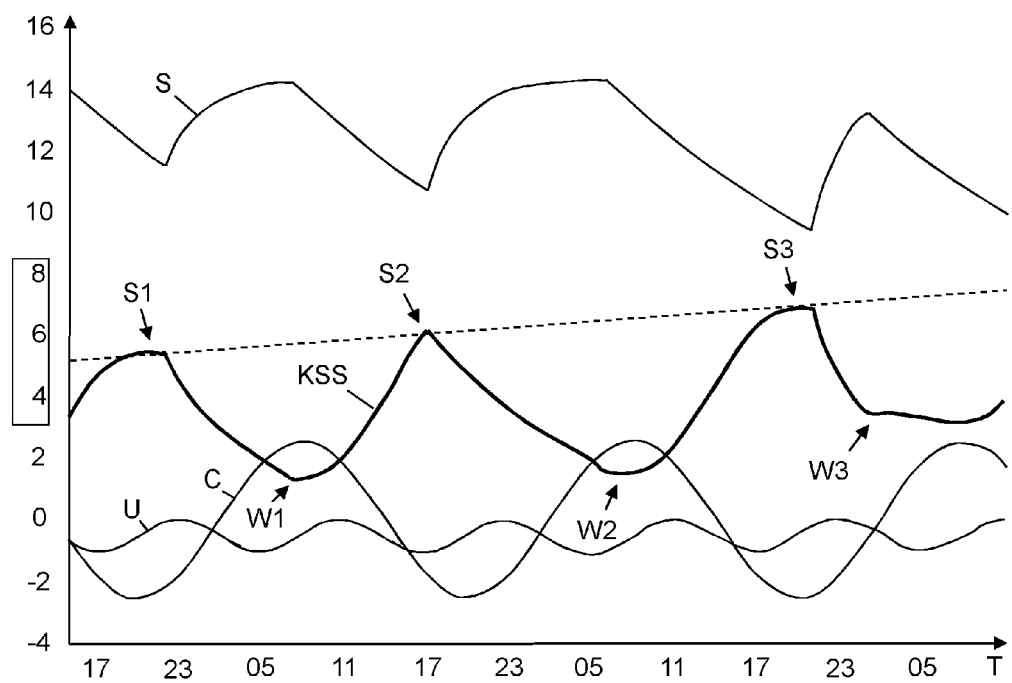

FIG. 4 shows how the tiredness level is affected over several days.

The maximum values for KSS are marked S1, S2 and S3 corresponding to when the person went to sleep on day 1, day 2 and day 3 respectively.

In the same way, the times when the person woke up are marked W1, W2 and W3.

A broken line across the peaks shows the person's maximum tiredness level rising, which may indicate that he/she needs longer rests.

Figure 5:
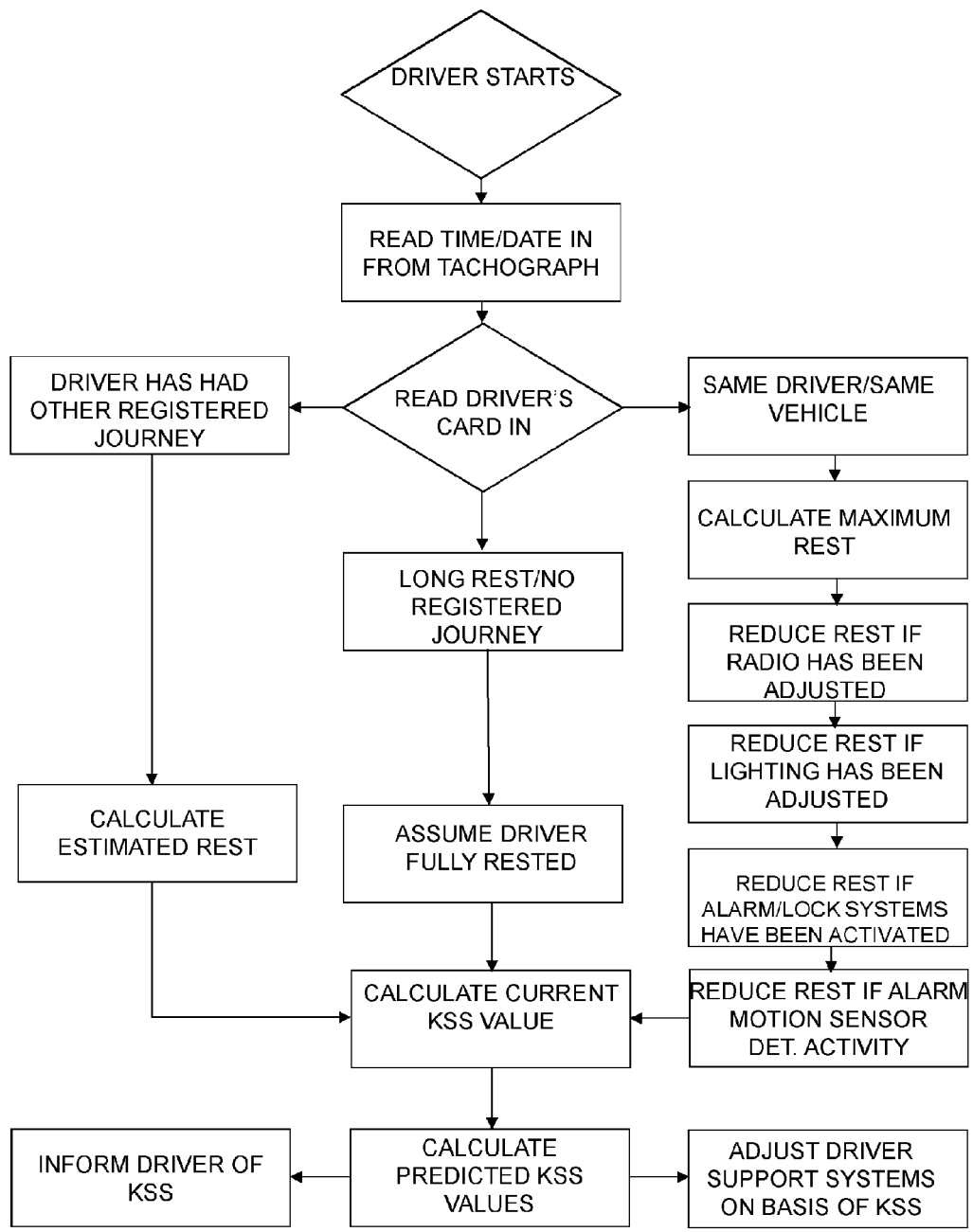
FIG. 5 is a flowchart which illustrates the method according to one embodiment of the present invention.

The flowchart in FIG. 5 illustrates one embodiment of the invention.

The process begins with the driver starting the vehicle. The time and date are read in from the tachograph and information from the driver's card is read in from the input unit, to the alertness modelling unit.

The information from the driver's card indicates whether the driver has had another registered journey, or whether the same driver has had a journey in the same vehicle.

If the driver has had another registered journey in another vehicle, an assessment is made as to whether this occurred within a specified period prior to the current journey, e.g. two or three days before. It this is the case, an estimated length of time is calculated for the rest which the driver has had, i.e. the parameter S is calculated. Current and predicted KSS values are then calculated, the driver is informed of them and the driver support system is adjusted on the basis of them.

If the information read in from the driver's card indicates either no registered journey or that the rest was longer than the specified period, the driver is assumed to be fully rested and current and predicted KSS values are then calculated.

Finally, if the information read in from the driver's card indicates that the same driver is driving the same vehicle, the alertness level S can be determined by calculating maximum rest and then adjusting this if various activities have been registered, e.g. the radio has been adjusted, the lighting has been adjusted, alarm/lock systems have been activated and the alarm's motion sensors detect activity. Current and predicted KSS values are then calculated and the driver is informed and/or the driver support system is adjusted on the basis of these KSS values.

The present invention is not limited to the preferred embodiments described above. Various alternatives, modifications and equivalents may be used. The above embodiments should therefore not be considered as limiting the invention's protective scope which is defined by the attached claims.

The invention claimed is:

1. A driver alertness detection system for a vehicle, the system comprising:
   a tachograph configured to generate a tachograph signal containing information about current clock time and the times of the vehicle's movements;
   a driver's card input unit configured to receive input of a report of a driver's recent driving conditions, from a driver's card, and to generate a driver's report signal containing driving conditions including information about driving and rest times for the driver;
   the vehicle further comprises one or more driver support systems;
   a driver's alertness modelling unit configured to calculate a current tiredness value and predicted tiredness values for the driver over a predetermined future period of time, using an alertness model, based on the tachograph signal and the driver's report signal;
   a control unit configured to generate control signals to control the one or more driver support systems on the basis of the calculated current and predicted tiredness values; and
   the calculated current and predicted tiredness values being conveyed to the control unit,
   wherein the one or more driver support systems is a driver warning system or a vehicle safety system, and
   wherein the control unit sets threshold values for the one or more driver support systems so that the higher the tiredness value, the more sensitive a driver support system setting.

2. A vehicle according to claim 1, wherein the control unit is configured to calculate the calculated current and predicted tiredness values using the formula $$KSS=10.9-0.6(S+C+U),$$

where S denotes the driver's sleep pattern, C denotes the circadian rhythm over a period of 24 hours, which characterises the biological sleep pattern, and U denotes the 12-hour ultradian rhythm based on the driver's diurnal biological activity.

3. A vehicle according to claim 1, wherein the predetermined future period of time is shorter than 36 hours.

4. A vehicle according to claim 1, wherein the predetermined future period of time is shorter than 12 hours.

5. A vehicle according to claim 1, wherein the calculated current and predicted tiredness values is between 1 and 9, where 1 denotes least tiredness and 9 most tiredness.

6. A vehicle according to claim 1, wherein the calculated current and predicted tiredness values is calculated continuously.

7. A vehicle according to claim 1, wherein the calculated current and predicted tiredness values is calculated using a predetermined interval of 10-1000 seconds between consecutive calculations.

8. A vehicle according to claim 1, wherein the control unit is configured to generate a control signal, and a display system in the vehicle for display of calculated tiredness values and the control unit generates the control signal.

9. A vehicle according to claim 1, wherein the vehicle comprises a monitoring system for monitoring of driver activity, the monitoring system being configured for generating an alertness signal containing information about the driver's activity in the vehicle, and the alertness signal is configured for conveying the information to the driver's alertness modelling unit and configured for calculating the current and predicted tiredness values for the driver over the predetermined future period of time.

10. A vehicle according to claim 9, wherein the monitoring system is configured to monitor the driver's movements in the vehicle.

11. A vehicle according to claim 9, wherein the monitoring system is configured to monitor the driver's steering behaviour.

12. A vehicle according to claim 9, wherein the monitoring system is configured to monitor the vehicle's movements in its traffic lane.

13. A method for detecting driver alertness in a vehicle, comprising:
generating a tachograph signal containing information about current clock time and vehicle movement;
generating from a driver's input information a driver's report signal containing information about driving and rest times for the driver, wherein the vehicle further comprises one or more driver support systems; and
calculating, using an alertness model, a current tiredness value and predicted tiredness values for the driver over a predetermined future period of time, based on the tachograph signal and driver's report signal;
conveying the calculated current and predicted tiredness values to a control unit;
determining control signals for the one or more driver support systems on the basis of the calculated current and predicted tiredness values;
setting threshold values for the driver support systems so that the higher the tiredness value, the more sensitive driver support system settings;
operating the one or more driver support systems based on a control signal;
wherein the one or more driver support systems is either a driver warning system or a vehicle safety system.

14. A method according to claim 13, wherein the calculated current and predicted tiredness values is calculated using the formula $$KSS=10.9-0.6(S+C+U),$$

where S denotes the driver's sleep pattern, C denotes the circadian rhythm over a period of 24 hours, which characterises the biological sleep pattern, and U denotes the 12-hour ultradian rhythm based on the driver's diurnal biological activity.

15. A method according to claim 13, wherein the predetermined future period of time is shorter than 36 hours.

16. A method according to claim 13, wherein the calculated current and predicted tiredness values is between 1 and 9, where 1 denotes least tiredness and 9 most tiredness.

17. A method according to claim 13, wherein the calculated current and predicted tiredness values is calculated using a predetermined interval of 10-1000 seconds between consecutive calculations.

18. A method according to claim 13, wherein the control unit is configured to generate a control signal and a display system in the vehicle for display of calculated tiredness values.

19. A method according to claim 13, comprising generating from a monitoring system for monitoring of driver activity an alertness signal which contains information about the driver's activity in the vehicle and conveying the information to the safety system to be used to calculate current and predicted tiredness values for the driver over the predetermined future period of time.

20. A method according to claim 19, further comprising monitoring the driver's movements in the vehicle.

21. A method according to claim 19, further comprising monitoring the driver's steering behaviour.

22. A method according to claim 19, further comprising monitoring the vehicle's movements in its traffic lane.

* * * * *